Figure 1:
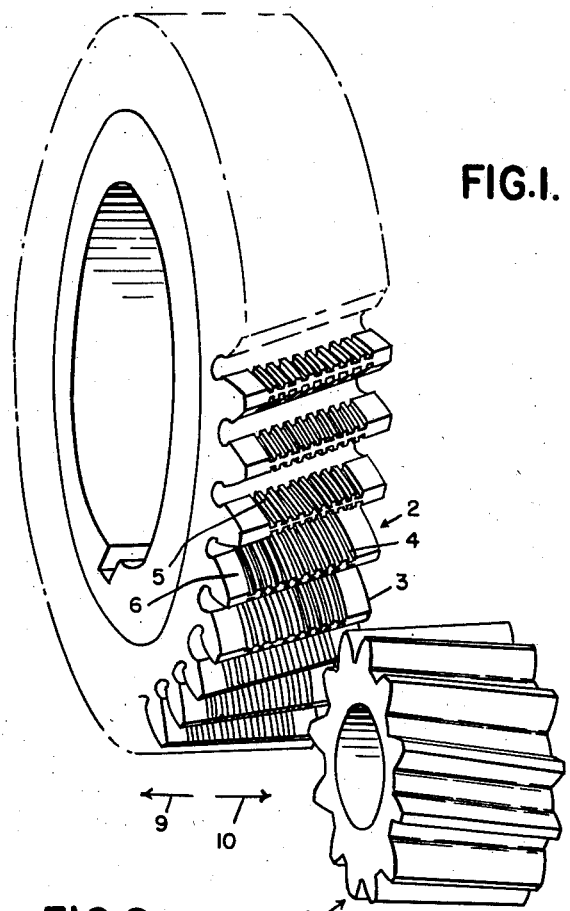

July 10, 1945.                    H. ASHTON                    2,380,208
                           METHOD OF FINISHING GEARS
                              Filed Jan. 2, 1943

INVENTOR.
HAROLD ASHTON
BY
ATTORNEYS

Patented July 10, 1945

2,380,208

UNITED STATES PATENT OFFICE 2,380,208

METHOD OF FINISHING GEARS

Harold Ashton, Detroit, Mich., assignor to National Broach & Machine Company, Detroit, Mich., a corporation of Michigan Application January 2, 1943, Serial No. 471,157

2 Claims. (Cl. 90—1.6)

The invention relates to gear finishing and refers more particularly to the finishing of external gears by gear-like cutting tools.

In this type of gear finishing, as illustrated in the R. S. Drummond Patent No. 2,270,421, issued January 20, 1942, the external gear and the gear-like cutting tool having conjugate teeth are placed in mesh at crossed axes. The teeth of the tool have shallow serrations or gashes in their working surfaces extending from the tops to the bottoms of the teeth and providing inner and end lands with lateral cutting edges in the working surfaces. The gear and tool are rotated while in mesh, are relatively reciprocated generally axially of the gear and are relatively fed toward each other at each end of the stroke until the desired amount of stock has been removed from the gear. Then the relative feeding of the gear and tool toward each other is discontinued, but the rotation in mesh and the relative reciprocation of the gear and tool are continued for a predetermined number of relative reciprocations to give the surfaces of the gear teeth a final finishing action. It is customary to make the inner lands and the serrations or gashes with widths of approximately .030″ to .050″ and to make the end lands of slightly greater width, such as approximately .054″ to stiffen the end lands to withstand the usual pressure of the tool on the gear.

It has been found that with this method of finishing external gears and with this cutting tool the surfaces of the gear teeth are often marked at or near their ends with lands which are not acceptable on gears, and especially aviation gears.

The present invention has for one of its objects to finish an external gear by a gear like cutting tool in such a manner that the gear may be finished without marking of the surfaces of the gear teeth.

The invention has for another object to finish an external gear by a gear-like cutting tool in such a manner that only the end lands of the tool contact the ends of the gear and the end lands provide an extended bearing contact at the ends of the stroke when reversal of relative reciprocation of the gear and tool occurs and also when relative reciprocation and also rotation are discontinued at the end of the finishing cycle to thereby eliminate marking the gear.

The invention has for a further object to provide a cutting tool designedly constructed with end lands of a width sufficient to enable reversing the relative reciprocation of the gear and tool, stopping the relative reciprocation and stopping the rotation when the ends of the gear contact the end lands of the tool intermediate their ends, and also to enable the portions of the end lands in contact with the gear to take the pressure between the tool and the gear without marking the gear.

Figure 2:
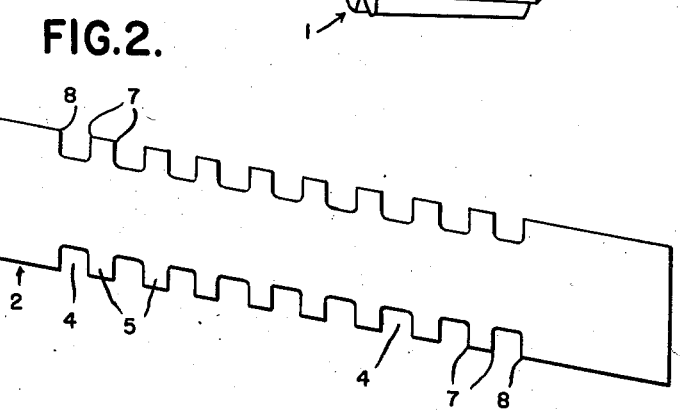

Other objects of the invention will be apparent as the description proceeds and when taken in conjunction with the accompanying drawing, in which Figure 1 is a diagrammatic view illustrating the relationship between the external gear to be finished and the cutting tool;

Figure 2 is a top view of one tooth of the cutting tool.

As illustrated in Figure 1, 1 is the external gear to be finished and 2 is the cutting tool held in mesh with the gear at crossed axes. As shown in the present instance, the axes of the cutting tool and gear are located in horizontal planes with the axes at an angle to each other. The tool is gear-like and one-piece and has teeth 3 conjugate to the gear teeth as finished by the tool. The tool is provided with a cutting portion intermediate its ends which is formed by the shallow serrations or gashes 4 in the working surfaces of the teeth extending from the tops to the bottoms thereof. The serrations provide the inner lands 5 and the end lands 6 having the lateral cutting edges 7 and 8, respectively, in the working surfaces.

To finish the gear, the gear and tool are rotated while in mesh preferably by driving the tool. During the rotation the gear and tool are relatively reciprocated generally axially of the gear preferably by axially reciprocating the gear, as indicated by the arrows 9 and 10 of Figure 1, the length of reciprocatory stroke being predetermined. Also, during the rotation the gear and tool are relatively fed toward each other at each end of the stroke preferably by raising the gear toward the tool a measured amount. The direction of rotation is preferably reversed at each end of the stroke. When the desired amount of material has been cut from the surfaces of the teeth the relative feeding of the gear and tool toward each other is discontinued and the rotation of the gear and tool and the relative reciprocation of the gear and tool are preferably continued for a time, after which the relative reciprocation of the gear and tool is discontinued at an end of a stroke and the rotation of the gear and tool is also discontinued.

The reciprocation of the gear 1 bears a definite relation to the tool 2, the stroke being of predetermined length to positively position the cutting portion of the tool beyond the surfaces of the gear teeth and either one or the other of the end lands 6 of the tool in contact intermediate its ends with either one end or the other end of the surfaces of the gear teeth at the ends of the stroke. Preferably the length of stroke is such that at its ends the end lands of the tool contact approximately midway of their ends with the ends of the teeth surfaces. Also the end lands of the tool are designedly made relatively wide so that at the ends of the stroke the end lands contact the ends of the teeth surfaces over an extended area.

The end lands 6 of the tool are each of considerably greater width than an inner land 5 and the width is from three to seven times the width of the inner land to enable positively positioning the end lands in contact approximately midway of their ends with the ends of the surfaces of the gear teeth at the ends of relative reciprocation. The width is also such that it enables portions of the end lands in contact with the teeth surfaces to take the pressure between the tool and gear without marking the end portions of the gear teeth surfaces when the relative reciprocation of the gear and tool is reversed and also when the relative reciprocation is discontinued and the rotation discontinued at the end of the finishing cycle.

It is essential that the end lands of the tool have a width in excess of .100" for this purpose. The width of the end lands may vary preferably from .140" to .250", any greater width having but little utility and being somewhat wasteful of material.

Figure 2 illustrates, on an enlarged scale, the tooth of a tool which has been found very satisfactory. The shallow serrations or gashes 4 are of uniform width, each being .040" and the inner lands 5 are also of uniform width, each being .031". The end lands 6 are of the same width, which is .196". With this tool, during the finishing of the external gear the end lands contact the ends of the gear approximately midway of the ends of the end lands and provide sufficient material in supporting contact with the ends of the gear during the reversal and stopping of the relative reciprocation to offset the pressure of the tool on the gear without marking the end portions of the gear teeth.

What I claim as my invention is:

1. The method of finishing an external gear member without marking the same which comprises meshing at crossed axes the gear member with a gear-like cutting tool member having a cutting portion and lands at the ends of the cutting portion of a minimum width of approximately $\frac{3}{16}$ inch, rotating the gear member and tool member while in mesh, relatively reciprocating the gear member and tool member generally axially of the gear member during their rotation with a predetermined length of stroke to positively position the cutting portion of the tool member beyond the ends of the gear member and approximately one-half the width of an end land in supporting contact with the gear member at the ends of the stroke, relatively feeding the gear member and tool member toward each other at an end of the stroke, discontinuing the relative feeding when the desired amount of material has been cut from the gear member, and then discontinuing the relative reciprocation at an end of a stroke and also discontinuing the rotation.

2. The method of finishing the teeth surfaces of an external gear without marking the teeth surfaces which comprises meshing at crossed axes the gear with a cutting tool having teeth formed with shallow spaced serrations extending from the tops to the bottoms of their working surfaces and providing inner lands and end lands with lateral cutting edges with the end lands of a minimum width of approximately $\frac{3}{16}$ inch, rotating the gear and tool member while in mesh, relatively reciprocating the gear and tool during their rotation generally axially of the gear with a predetermined length of stroke to position the end lands of the tool in contact approximately midway of their ends with the ends of the teeth surfaces of the gear at the ends of the stroke, relatively feeding the gear and tool toward each other at each end of the stroke, discontinuing the relative feeding, and then discontinuing relative reciprocation at an end of the stroke, and also discontinuing rotation.

HAROLD ASHTON.